United States Patent
Lasser et al.

(10) Patent No.: US 8,190,206 B2
(45) Date of Patent: May 29, 2012

(54) DUAL CHANNEL SMART CARD DATA STORAGE

(75) Inventors: Menahem Lasser, Kohav-Yair (IL); Eitan Mardiks, Ra'anana (IL)

(73) Assignee: Sandisk IL Ltd., Kfar Saba (IL)

( * ) Notice: Subject to any disclaimer, the term of this patent is extended or adjusted under 35 U.S.C. 154(b) by 1032 days.

(21) Appl. No.: 11/710,989

(22) Filed: Feb. 27, 2007

(65) Prior Publication Data
US 2008/0009317 A1 Jan. 10, 2008

Related U.S. Application Data

(60) Provisional application No. 60/806,532, filed on Jul. 4, 2006.

(51) Int. Cl.
*H04W 4/00* (2009.01)
(52) U.S. Cl. ........ 455/558; 235/380; 235/451; 235/441; 235/492; 711/103
(58) Field of Classification Search .................. 455/558; 235/492, 380, 441, 451; 711/103
See application file for complete search history.

(56) References Cited

U.S. PATENT DOCUMENTS

| | | | | |
|---|---|---|---|---|
| 5,799,171 | A  * | 8/1998 | Kondou | 703/27 |
| 2004/0065734 | A1* | 4/2004 | Piikivi | 235/451 |
| 2007/0023503 | A1* | 2/2007 | Kang | 235/380 |
| 2007/0136509 | A1* | 6/2007 | Agami | 711/103 |
| 2007/0158439 | A1 | 7/2007 | Conner et al. | |
| 2007/0259691 | A1 | 11/2007 | Santos Garcia | |
| 2008/0009317 | A1* | 1/2008 | Lasser et al. | 455/558 |

OTHER PUBLICATIONS

International Search Report and Written Opinion received in corresponding PCT Application No. PCT/IL07/00829 from the International Searching Authority (US) mailed Jul. 25, 2008, 7 pages.

* cited by examiner

*Primary Examiner* — Pierre-Louis Desir
(74) *Attorney, Agent, or Firm* — Toler Law Group, PC

(57) ABSTRACT

A SIM card comprising at least a first interface and a second interface different from the first interface is disclosed. In some embodiments, the SIM card is operative to receive data through the first interface, store the received data within the SIM card, and send back the stored data via the second interface. This enables a host operatively coupled with the SIM card to write data to the SIM card via the first interface and to read back the data via the second interface. Furthermore, a technique for extending the SIM EEPROM storage by keeping a portion of the file in flash is provided.

26 Claims, 13 Drawing Sheets

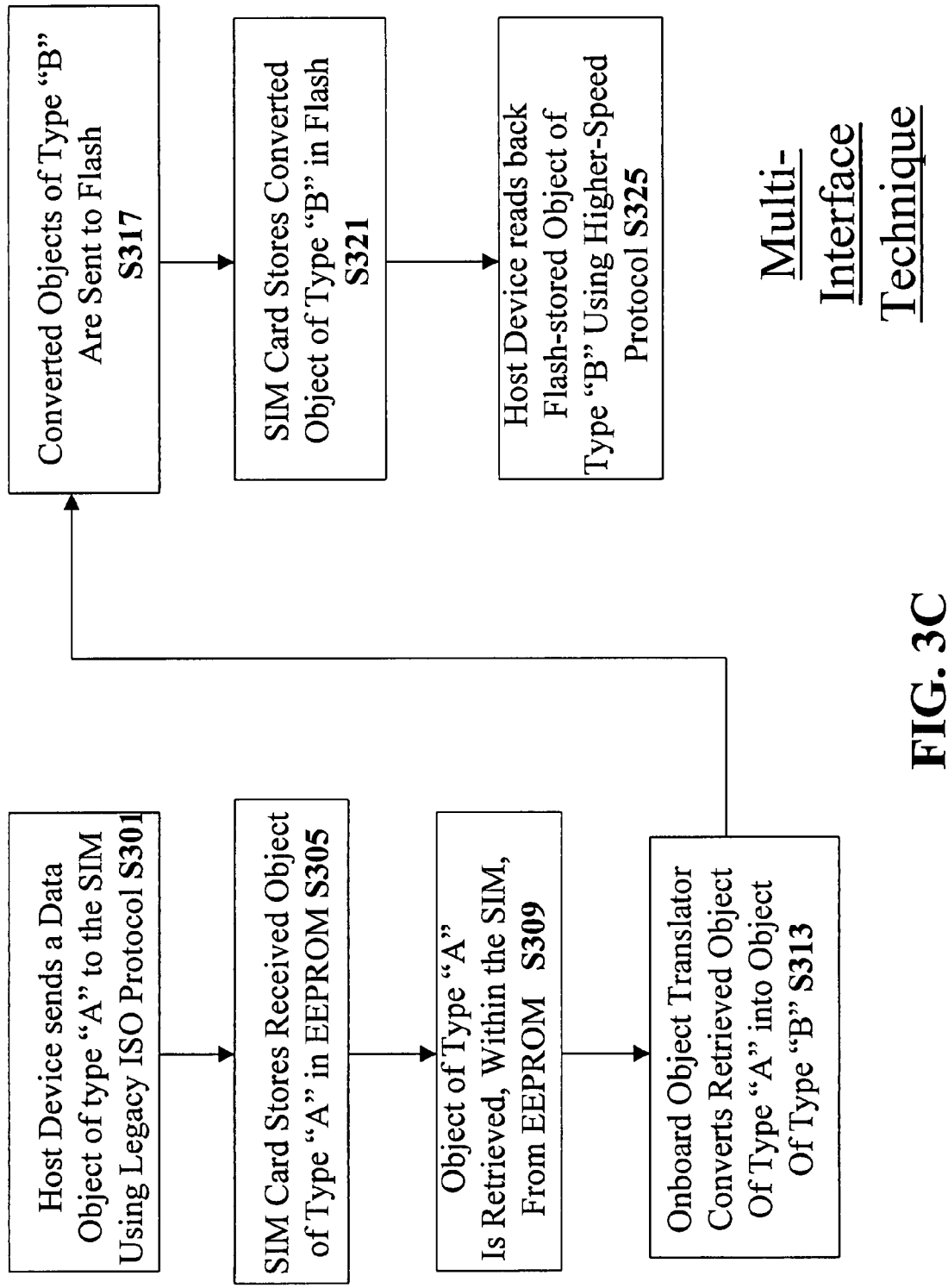

DUAL CHANNEL SMART CARD DATA STORAGE

CROSS-REFERENCE TO RELATED APPLICATIONS

This patent application claims the benefit of U.S. Provisional Patent Application No. 60/806,532 filed Jul. 4, 2006 by the present inventors.

FIELD OF THE INVENTION

The present invention relates to methods, apparatus and computer-code handling for data transactions in subscriber identity module (SIM) cards that include both a legacy ISO interface and a high speed interface.

BACKGROUND

A SIM card is a removable device installed in all GSM cell phones and also in many other types of cell phones. The legacy SIM card is used to uniquely identify the phone subscriber. It also has additional capabilities such as a phone book storage and SMS messages storage.

High Capacity SIM cards have been recently introduced. This type of SIM card is fully compatible with the legacy SIM card but has additional, large capacity, low cost Flash storage (as compared to the legacy SIM using EEPROM technology for storage). In addition, a High Capacity SIM card has two interfaces, the legacy SIM interface defined by the ISO 7816 standard, and an additional high speed interface, such as the USB or the MultiMediaCard (MMC) interface.

The legacy SIM manages its own file system in its EEPROM storage. This file system is transparent to the mobile phone application accessing the SIM. According to the ISO protocol, the application provides the SIM with the file name and some additional attributes and then either provides the data in the file to the SIM (write), or gets it from the SIM (read). The SIM is responsible for managing the internal file system. Independently, using a High Capacity SIM, a phone-based application can create a file system on the flash storage using the high speed interface for data transfer; this secondary file system is transparent to the ISO protocol-based file storage.

FIG. 1 provides a block diagram of a system including a host device 10A (typically a cell phone) operatively coupled with a high capacity SIM card 22A via two different interfaces: ISO 7816 interface 50 is used for legacy SIM functions and MultiMediaCard (MMC) interface 52 is typically used for storage access. Both the host 10A as well as the SIM 22A may include control circuitry (not shown), for example, a microprocessor (not shown) for executing code, an internal data bus (not shown), ROM (not shown) for storing the code executed by the CPU (not shown) and RAM (not shown) for storing software variables.

SIM Card 22A includes two types of non-volatile storage: EEPROM 54 (i.e. a small non-volatile storage for storing permanent data accessed on a byte-by-byte level) and flash memory storage 20 for storing large amounts of data that is accessed on a sector level. Furthermore, host device 10A may communicate with the SIM 22A via either or both of two independent interfaces—a legacy ISO 7816 interface 50 (used for legacy SIM functions) and a high-speed interface 52 (for example, a MMC interface 52 or a USB interface or any other high-speed interface—typically used for storage access). Thus, there are two communications links illustrated in FIG. 1A—a legacy ISO 7816 protocol communications link 70 and a high speed (for example, MMC protocol) communications link 72. Data received by SIM 22A via the legacy ISO interface 70 is stored in the legacy EEPROM 54, while data received via the high speed interface 52 is stored in the much larger and faster flash memory 20.

As illustrated in FIG. 1, a plurality of software applications (i.e. application A 12 and application B 14) execute independently on the host 10A. In one particular example, Application A 12 is a legacy SIM phone book application and Application B 14 is Microsoft Outlook®. There is no connection between the two applications—each manages its data separately.

FIGS. 1B-1C illustrate prior art routines for writing data to the SIM card 22A and reading back the stored data. As illustrated in FIGS. 1B-1C, two completely independent routines are used—a first routine using the legacy ISO interface 50 and the legacy EEPROM storage 54 (i.e. steps S101, S105 and S109—see the left side of FIG. 1C) and a second routine using the high speed interface 52 and the larger, faster flash memory 20 (i.e. steps S121, S125 and S129—see the right side of FIG. 1C).

It would be highly desirable to have a technique where data written using one of the interfaces (i.e. one of ISO interface 50 and the high speed interface 52) can be read back using the other of the interfaces. This would be useful, for example, for facilitating data accessibility. It would also be desirable to take advantage of the flash storage and to use a portion of the flash memory to extend the capacity of the EEPROM-based file system.

SUMMARY

The present inventors are now disclosing apparatus, methods and computer-code where data is written via one interface of the High Capacity SIM and read back using the second interface. In addition, the present inventors are disclosing a technique for extending the SIM EEPROM storage by keeping a portion of the files in the flash instead of the EEPROM.

It is now disclosed for the first time method of providing data storage services to a mobile phone comprising the steps of: a) operatively coupling a SIM card to the mobile phone, the SIM card having a first card interface, a second card interface different from the first card interface, and a memory; b) receiving data by the SIM card from the mobile phone, via the first card interface; c) storing the received data within the memory; d) subsequent to the storing, receiving a data read-request for the stored data from the mobile phone; and e) subsequent to the receiving of the data read-request, sending the data to the mobile phone from the SIM card via the second card interface.

According to some embodiments, the data read request is received via the second card interface.

According to some embodiments, i) the data receiving via the first interface is carried out using one of a file-type protocol and a block-type protocol; ii) the data sending via the second interface is carried out using the other of the file-type protocol and the block-type protocol. Thus, in one example, if the data receiving is carried out using a file-type protocol, the data sending is carried out using a block-type protocol. In another example, if the data receiving is carried out using a block-type protocol, the data sending is carried out using a file-type protocol.

According to some embodiments, the data is received using a file-type protocol.

According to some embodiments, the sending of the data is carried out using a block-type protocol.

According to some embodiments, the data is received using a block-type protocol.

According to some embodiments, the sending of the data is carried out using a file-type protocol.

According to some embodiments, at least one of the first card interface and the second card interface is a contactless interface.

According to some embodiments, the first card interface is an ISO 7816 interface and the second card interface is a high-speed interface.

According to some embodiments, the second card interface is selected from the group consisting of an MMC interface, an USB interface and a secure digital (SD) interface.

According to some embodiments, the memory of the SIM includes non-volatile memory, and the storing of step (c) includes storing the data in the non-volatile memory.

According to some embodiments, the non-volatile memory of the SIM includes flash memory, and the storing of step (c) includes storing the data in the flash memory.

According to some embodiments, the method further comprises the step of: f) subsequent to the storing in the non-volatile memory, retrieving the stored data from the non-volatile memory, wherein the sending of step (e) includes sending the retrieved data.

According to some embodiments, the storing of the step (c) includes: i) storing the data in EEPROM; ii) retrieving the EEPROM-stored data; and iii) storing the EEPROM-retrieved data in flash memory.

According to some embodiments, the method further comprises: f) effecting a data object type conversion of the retrieved EEPROM-stored data before the step of storing in the flash memory.

According to some embodiments, the non-volatile memory includes flash memory and EEPROM memory, and the storing includes: i) determining, in accordance with at least one attribute of the received data, a storage location for the received data selected from the group consisting of the EEPROM memory and the flash memory; and ii) storing the received data in the determined storage location.

It is now disclosed for the first time a method of storing data in the SIM card a system comprising a mobile phone and a SIM card operatively coupled with the mobile phone, the SIM card including an ISO 7816 interface, flash memory, and an EEPROM. The method comprises the steps of: a) receiving a data file from the phone by the SIM card via the ISO 7816 interface of the SIM card; and b) determining a storage location for the received data file selected from the group consisting of the EEPROM of the SIM card and the flash memory of the SIM card in accordance with at least one file attribute of the received file.

According to some embodiments, the method further comprises the step of: c) storing the received data file in the determined storage location.

It is now disclosed for the first time a method of data storage and retrieval by a mobile phone comprising the steps of: a) operatively coupling the mobile phone with a SIM card having a first card interface, a second card interface different from the first card interface, and a memory; b) sending from the mobile phone, via the first card interface, to the SIM card, data for storage; and c) subsequent to the sending of the data, retrieving the data from the SIM card via the second card interface of the SIM card.

It is now disclosed for the first time a computer readable storage medium having computer readable code embodied in the computer readable storage medium, the computer readable code for: a) sending from the mobile phone, via the first card interface, to the SIM card, data for storage; and b) subsequent to the sending of the data, retrieving the data from the SIM card via a second card interface different from the first card interface, of the SIM card.

It is now disclosed for the first time a SIM card device for providing data storage services to a mobile phone, the SIM card comprising: a) a secured mobile phone identity module for providing phone identity services to the mobile phone; b) a first card interface and a second card interface different from the first card interface, each the interface for interfacing with the mobile phone; c) a memory for data storage; and d) a data-transfer controller operative to effect data transfer operations with the mobile phone via the first and the second card interfaces, the controller further operative to: i) upon receiving data from the mobile phone via the first card interface, store the received data in the memory; and ii) in accordance with a data read request received from the mobile phone, send the stored data to the mobile phone via the second card interface.

According to some embodiments, the data read request is received via the second card interface.

According to some embodiments, the memory includes a flash memory and EEPROM memory, and the controller is operative to: i) determine, in accordance with at least one attribute of the received data, a storage location for the received data file selected from the group consisting of the EEPROM memory and the flash memory; ii) store the received data in the determined storage location.

According to some embodiments, the device (e.g. the combination of the controller and the interfaces) is operative to: i) carry out the data receiving via the first interface using one of a file-type protocol and a block-type protocol; ii) carry out the sending via the second interface using the other of the file-type protocol and the block-type protocol.

According to some embodiments, at least one of the first card interface and the second card interface is a contactless interface.

According to some embodiments, the first card interface is an ISO 7816 interface and the second card interface is a high-speed interface.

According to some embodiments, the second card interface is selected from the group consisting of an MMC interface, a secure digital (SD) interface, and a USB interface According to some embodiments, the memory includes non-volatile memory (for example, EEPROM or flash), and the controller is configured to carry out the storing of d(ii) such that at least some data received via the first card interface is stored in the non-volatile memory.

According to some embodiments, the memory includes flash memory, and the controller is configured to carry out the storing of d(ii) such that at least some data received via the first card interface is stored in the flash memory.

According to some embodiments, the controller is further operative to: iii) subsequent to the storing in the non-volatile memory, retrieve the non-volatile-memory-stored data from the non-volatile memory, and wherein the controller is further operative such that the sending includes sending the retrieved data.

According to some embodiments, the non-volatile memory includes: i) EEPROM; and ii) flash memory, and wherein the controller is further operative such that the storing in the non-volatile memory includes: A) storing the data in the EEPROM; B) retrieving the EEPROM-stored data; and C) storing the EEPROM-retrieved data in the flash memory.

According to some embodiments, the SIM card device further comprises: e) a data object converter for effecting a data object type conversion of the retrieved EEPROM-stored data before the storing in the flash memory.

It is now disclosed for the first time a computer readable storage medium having computer readable code embodied in the computer readable storage medium, the computer readable code for: a) receiving data, by a SIM card from a mobile phone operatively coupled to the SIM card, via a first card interface of the SIM card; b) storing the received data within a memory of the SIM card; c) subsequent to the storing, receiving a data read-request for the stored data from the mobile phone; and d) subsequent to the receiving of the data read-request, sending the data to the mobile phone from the SIM card via a second card interface of the SIM card.

It is now disclosed for the first time a SIM card device for providing data storage services to a mobile phone operatively coupled to the SIM card, the SIM card comprising: a) a secured mobile phone identity module for providing phone identity services to the mobile phone; b) an ISO 7816 for receiving data files from the mobile phone; c) a flash memory for data storage; d) an EEPROM for data storage; e) a controller operative to: i) upon receiving a data file from the mobile phone via the ISO 7816 interface, determine, in accordance with at least one attribute of the received data, a storage location for the received data file selected from the group consisting of the EEPROM memory and the flash memory; and ii) store the received data file in the determined storage location.

It is now disclosed for the first time a computer readable storage medium having computer readable code embodied in the computer readable storage medium, the computer readable code for: a) receiving data, by a SIM card including EEPROM memory and flash memory, from a mobile phone operatively coupled to the SIM card, via an ISO 7816 interface of the SIM card; b) determining a storage location for the received data selected from the group consisting of the EEPROM of the SIM card and the flash memory of the SIM card in accordance with at least one attribute of the received data It is now disclosed for the first time a SIM card device for providing data handling services to a mobile phone, the SIM card comprising: a) a secured mobile phone identity module for providing phone identity services to the mobile phone; b) a first card interface and a second card interface different from the first card interface, each the interface for interfacing with the mobile phone; c) a data object handler operative to: i) receive from the mobile phone via the first card interface, a first data object of a first object type; ii) convert the received first data object of the first object type into a second data object of a second object type that is different from the first object type; and iii) send to the mobile phone, via the second card interface, the second data object of the second data type.

According to some embodiments, the SIM card device is operative to: i) carry out the data receiving via the first interface using one of a file-type protocol and a block-type protocol; ii) carry out the sending via the second interface using the other of the file-type protocol and the block-type protocol.

According to some embodiments, the first card interface is an ISO 7816 interface and the second card interface is a high-speed interface.

According to some embodiments, the second interface is an ISO 7816 interface and the first card interface is a high-speed interface.

According to some embodiments, the SIM card further comprises: d) a memory including first and second storage areas, the first storage area being configured to store at least one data object of the first object type, and the second storage area being configured to store at least one data object of the second object type, wherein the data object handler is further operative to: iv) store the received first object of the first type in the first storage area; v) retrieve the stored first object from the first area; vi) after the converting and before the sending, store the converted second object in the second storage area; vii) after the storing of the second object, retrieving the second object from the second storage area. and wherein: A) the converting includes converting the retrieved first object, and B) the sending includes sending the retrieved second object.

According to some embodiments, the second storage area is distinct from the first storage area.

According to some embodiments, the memory includes non-volatile memory, at least a portion of the first storage area is non-volatile, and at least a portion of the second storage area is non-volatile.

According to some embodiments, i) one of the first storage area and the second storage area includes EEPROM; ii) the other of the first storage area and the second storage area includes flash memory.

It is now disclosed for the first time a system comprising: a) any presently disclosed SIM card; and b) the mobile phone including at least one host processors, the mobile phone operatively coupled to the SIM card device; c) a first application residing on the mobile phone, at least one host processor operative to execute the first application, the first application operative to process objects of the first object type; d) a second application residing on the mobile phone, at least one host processor operative to execute the second application, the second application operative to process objects of the second object type; wherein the first application is operative to write objects of the first type via the first interface into the SIM card, and the second application is operative to retrieve objects of the second type via the second interface from the SIM card.

It is now disclosed for the first time a data-storage system comprising: a) a SIM card having a first card interface and a second card interface different from the first card interface; b) a mobile phone operatively coupled to the SIM card, the mobile phone configured (i.e. the mobile phone and/or an application residing within the mobile phone) to write data to the SIM card via the first card interface and to retrieve the data from the SIM card via second interface.

It is now disclosed for the first time a data-storage system comprising: a) a SIM card having a first card interface and a second card interface different from the first card interface; b) a mobile phone including at least one host processor operatively coupled to the SIM card; c) a first application residing on the mobile phone, at least one host processor operative to execute the first application, the first application operative to process objects of the first object type; d) a second application residing on the mobile phone, at least one host processor operative to execute the second application, the second application operative to process objects of the second object type; wherein the first application is operative to write objects of the first type via the first interface into the SIM card, and the second application is operative to retrieve objects of the second type via the second interface from the SIM card.

It is now disclosed for the first time a method of providing data storage services to a mobile phone. The method comprises the steps of a) operatively coupling a SIM card to the mobile phone, the SIM card including: i) a memory including first and second storage areas, the second storage area being distinct from the first storage area, the first storage area being configured to store objects of a first object type, the second storage area being configured to store objects of a second object type different than the first object type; ii) a first card interface and a second card interface different from the first card interface; b) receiving. by the SIM card from the mobile phone via the first interface, a first object of the first object type; c) storing the received first object in the first storage area; d) retrieving the stored first object from the first storage area; e) converting the retrieved first object into a second object of the second object type; and f) sending the second object to the mobile phone via the second interface.

According to some embodiments, the method further comprises: g) before the sending of the second object, storing the second object of the second type in the second storage area; and h) before the sending of the second object, retrieving the second object from the second storage area, wherein the sending of the second object includes sending the retrieved second object.

According to some embodiments, the first storage area includes EEPROM, the second storage area includes flash memory, the storing of the first object including storing the first object in the EEPROM, and the storing of the second object includes storing the second object in the flash memory.

According to some embodiments, one of the receiving of the first object and the sending of the second object is carried out using one of a block-type protocol and a file-type protocol and the other of the receiving of the first object and the sending of the second object is carried out using the other of the bock-type protocol and the file-type protocol.

According to some embodiments, the first card interface is an ISO 7816 interface and the second card interface is a high-speed interface According to some embodiments, the second interface is an ISO 7816 interface and the first card interface is a high-speed interface.

According to some embodiments, the memory of the SIM includes non-volatile memory, the first storage area and the second storage area are at least in part non-volatile, and the storing of step (c) includes storing the data in the non-volatile memory.

It is now disclosed for the first time a computer readable storage medium having computer readable code embodied in the computer readable storage medium, the computer readable code for: a) receiving by a SIM card from a mobile phone, via a first interface of the SIM card, a first data object of the first data object type, the SIM card having a memory including a first storage area and a second storage area distinct from the first storage area, the first storage area being configured to store at least one data object of the first object type, the second storage area being configured to store at least one data object of the second object type; b) storing the received first object in the first storage area; d) retrieving the stored first object from the first storage area; e) converting the retrieved first object into a second object of the second object type; and f) sending the second object to the mobile phone via the second interface These and further embodiments will be apparent from the detailed description and examples that follow.

BRIEF DESCRIPTION OF THE DRAWINGS

FIGS. 2B-2D describe exemplary 'single-interface' techniques for writing data to a SIM card and reading back the written data according to some embodiments of the present invention.

FIGS. 2E-2F, 3A-3D each describe exemplary 'multiple-interface' techniques for writing data to a SIM card using a first interface and reading back the written data using a different interface according to some embodiments of the present invention.

Figure 1A:
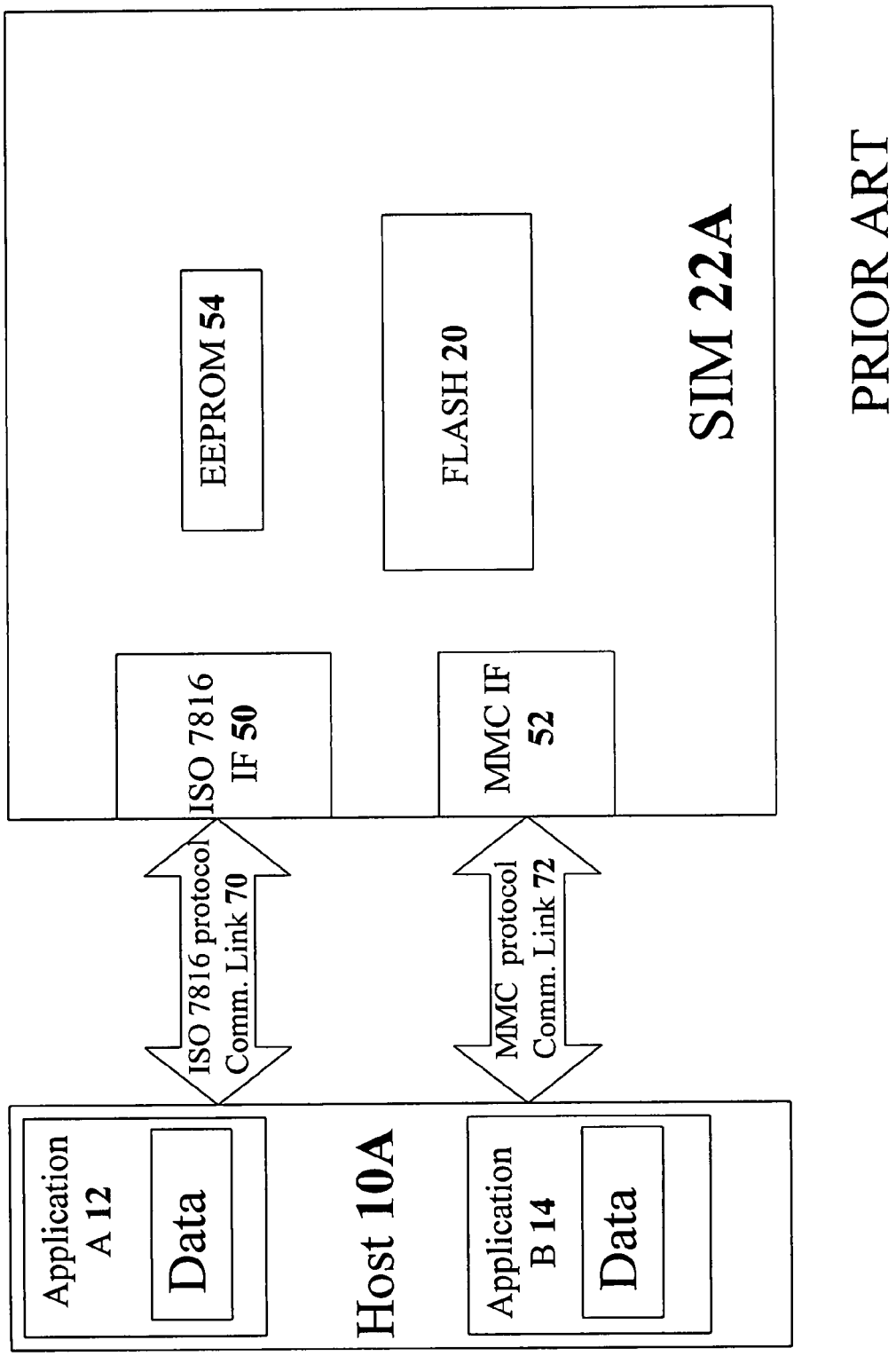
FIG. 1A provides a block diagram of a system including a host device operatively coupled with a high capacity SIM card via two different interfaces according to the prior art.
Figure 1B:
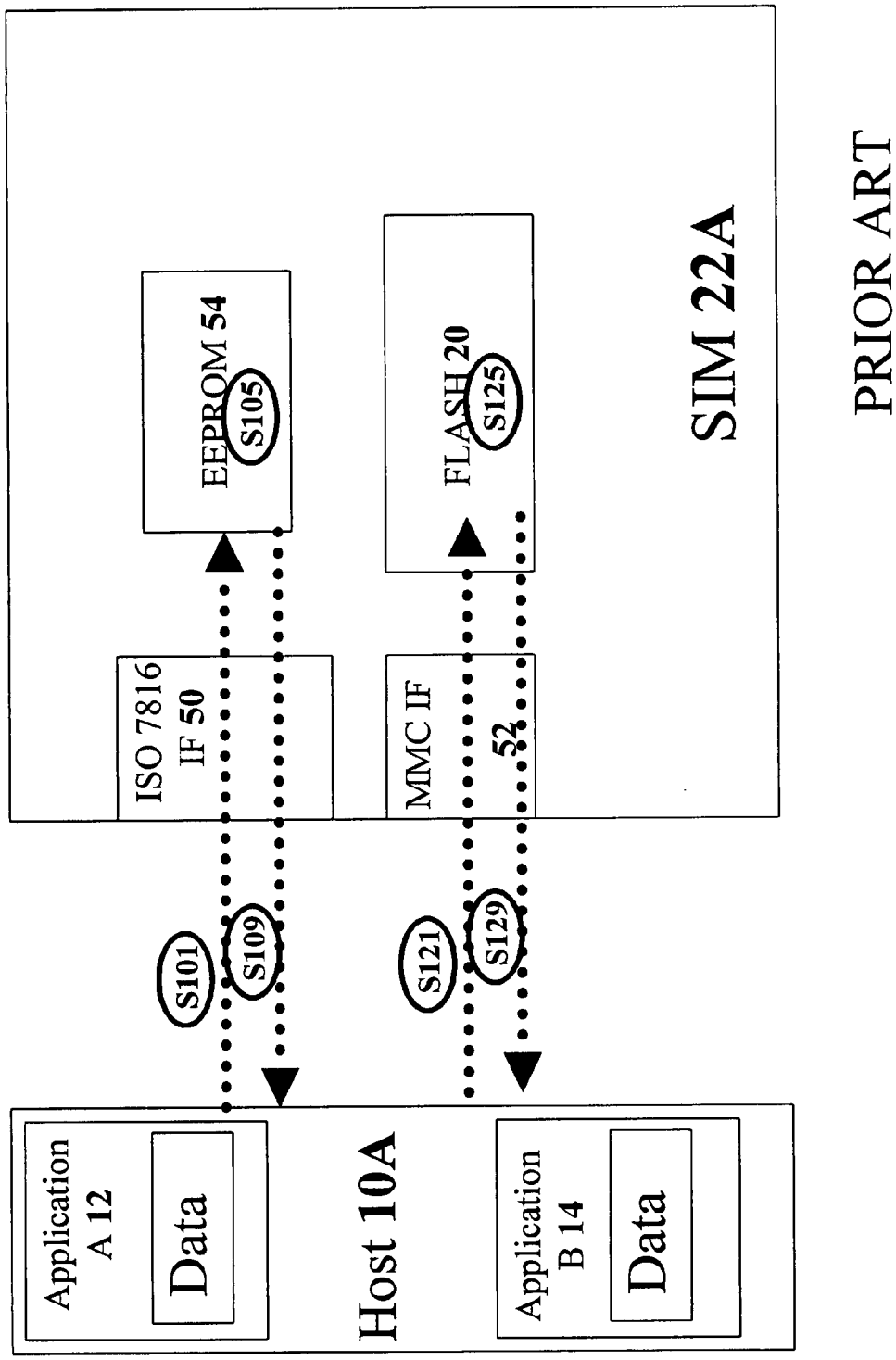
FIGS. 1B-1C describe a prior art technique for writing data to a SIM card and reading back the data.
Figure 1C:
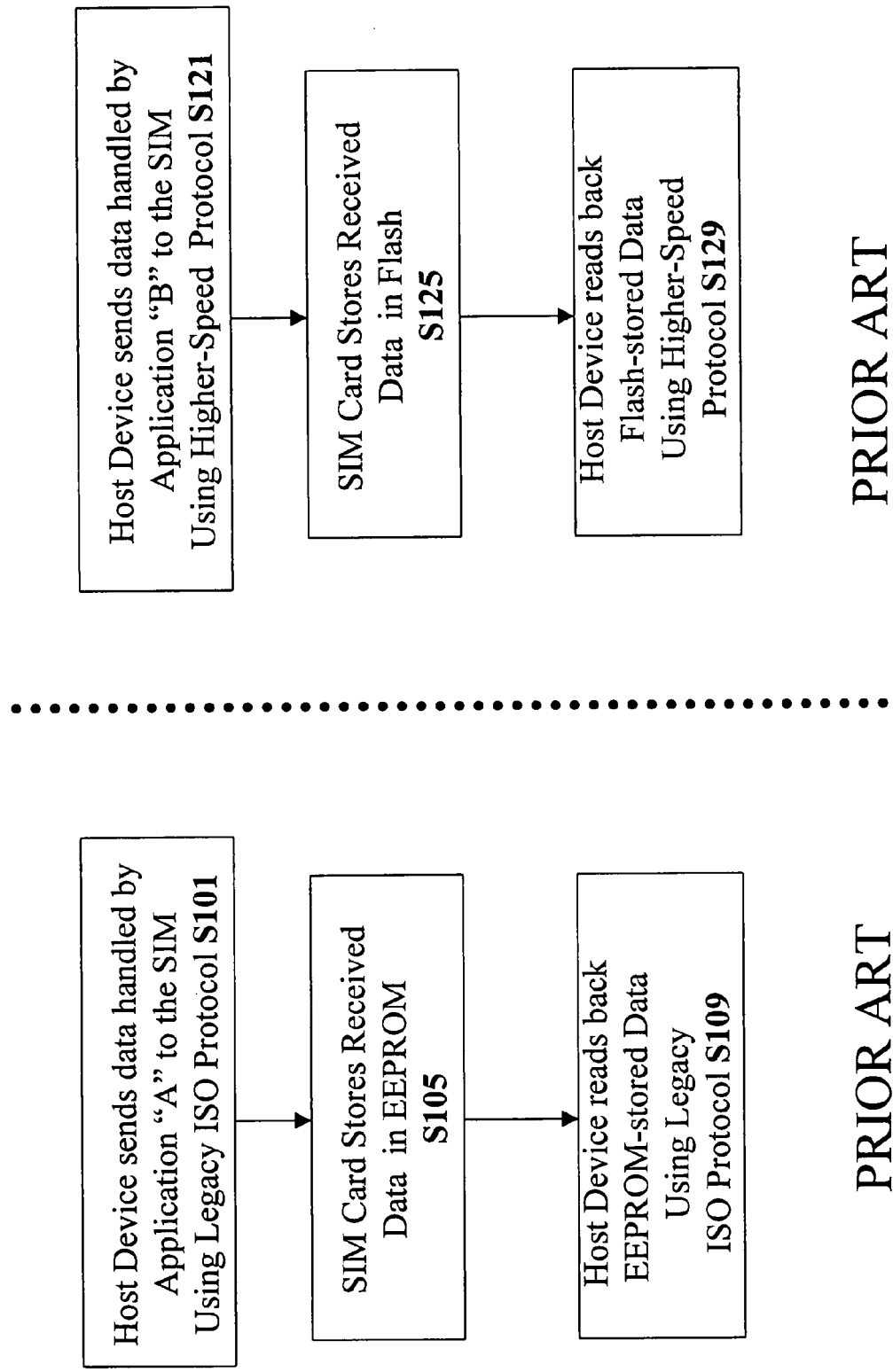

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the invention is to cover all modifications, equivalents and alternatives falling within the spirit and scope of the present invention. As used throughout this application, the word "may" is used in a permissive sense (i.e., meaning "having the potential to"), rather than the mandatory sense (i.e. meaning "must").

DETAILED DESCRIPTION OF EMBODIMENTS

The present invention will now be described in terms of specific, example embodiments. It is to be understood that the invention is not limited to the example embodiments disclosed. It should also be understood that not every feature of the presently disclosed apparatus, device and computer-readable code for handling smartcard data transfer and/or data storage and/or data handling is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first.

For convenience, certain terms employed in the specification, examples, and appended claims are collected here.

As used herein, a SIM card (Subscriber Interface Module) is a secured device used as a cell phone authentication device. For the simplicity of this application the term "SIM" is used as a generic name for any cell phone identity module, including the UMTS SIM (USIM) or the Removable User Identity Module (RUIM).

As used herein, a High Capacity SIM card is a SIM card including a Flash memory for storing large amounts of data and typically an additional high speed interface connecting between the high capacity SIM and the host.

As used herein, an 'object' is a collection of data items organized in a well defined format, e.g., a Microsoft Outlook phone book entry.

As used herein, a 'high speed' interface is an interface that is faster than ISO in terms of bits per second throughput. Exemplary high speed interfaces include but are not limited to USB interface, MultiMediaCard (MMC) interfaces, and secure digital (SD).

As used herein, 'interfacing' by a host device (e.g. a mobile phone) and a SIM card device refers to operatively coupling the mobile phone and the SIM.

As used herein, a 'data transfer controller' refers to any combination of electronic circuitry and/or computer code (i.e. software and/or firmware) operative to effect data transfer operations including but not limited to: a) receiving data via an interface (a type of 'external' or 'inter-device' data transfer); b) sending data via and interface; c) effect data storage operations storing data in memory (a type of 'internal' data transfer); and d) retrieving data from memory (a type of 'internal' data transfer).

As used herein, a "data object handler" refers to any combination of electronic circuitry and computer code for handling data objects—for example, carry out data transfer operations related to data objects, and data modification operations (for example, converting or modifying a data object format).

Figure 2A:
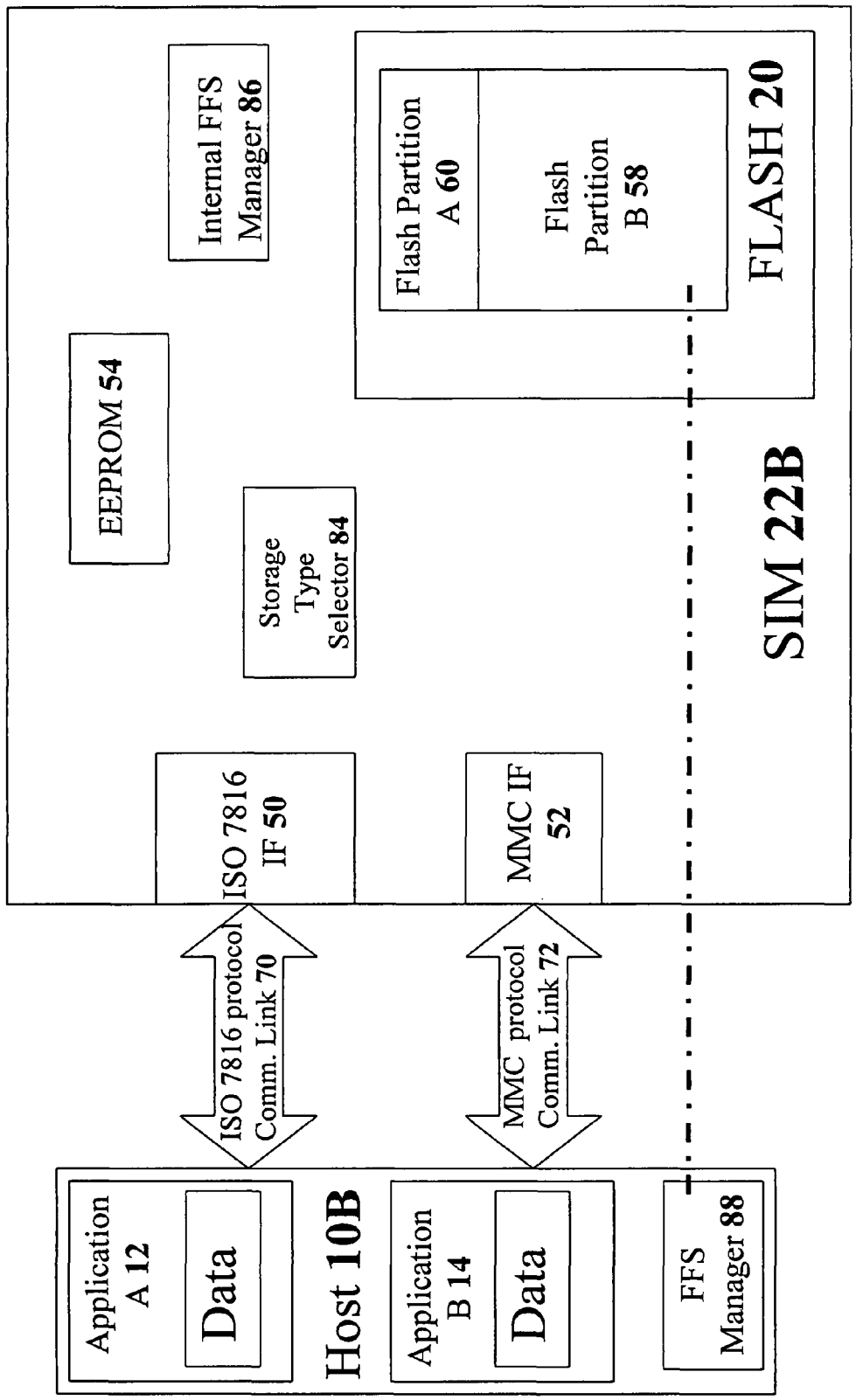
FIGS. 2A, 2B each provide a block diagram of a respective system including a host device operatively coupled with a high capacity SIM card via two different interfaces according to some embodiments of the present invention.

FIG. 2A provides a block diagram of a system comprising a host device 10B operatively coupled to an improved SIM card 22B in accordance with some embodiments of the present invention. In various embodiments, the system of FIG. 2A may be used to carry out: (I) routines where data is written to the SIM card via a given interface and read back via the same given interface (described in FIGS. 2B-2D and labeled as 'single-interface' techniques) and/or (II) routines where data is written to the SIM card via a first interface (i.e. either the legacy ISO interface 50 or high speed interface 52) and read back using a second interface different from the first interface (in one non-limiting example, if the data is written by sending data via the legacy interface, the data may be read back using the high speed interface; in another non-limiting example, if the data is written by sending data via the high speed interface, the data may be read back using the legacy interface.

Figure 2B:
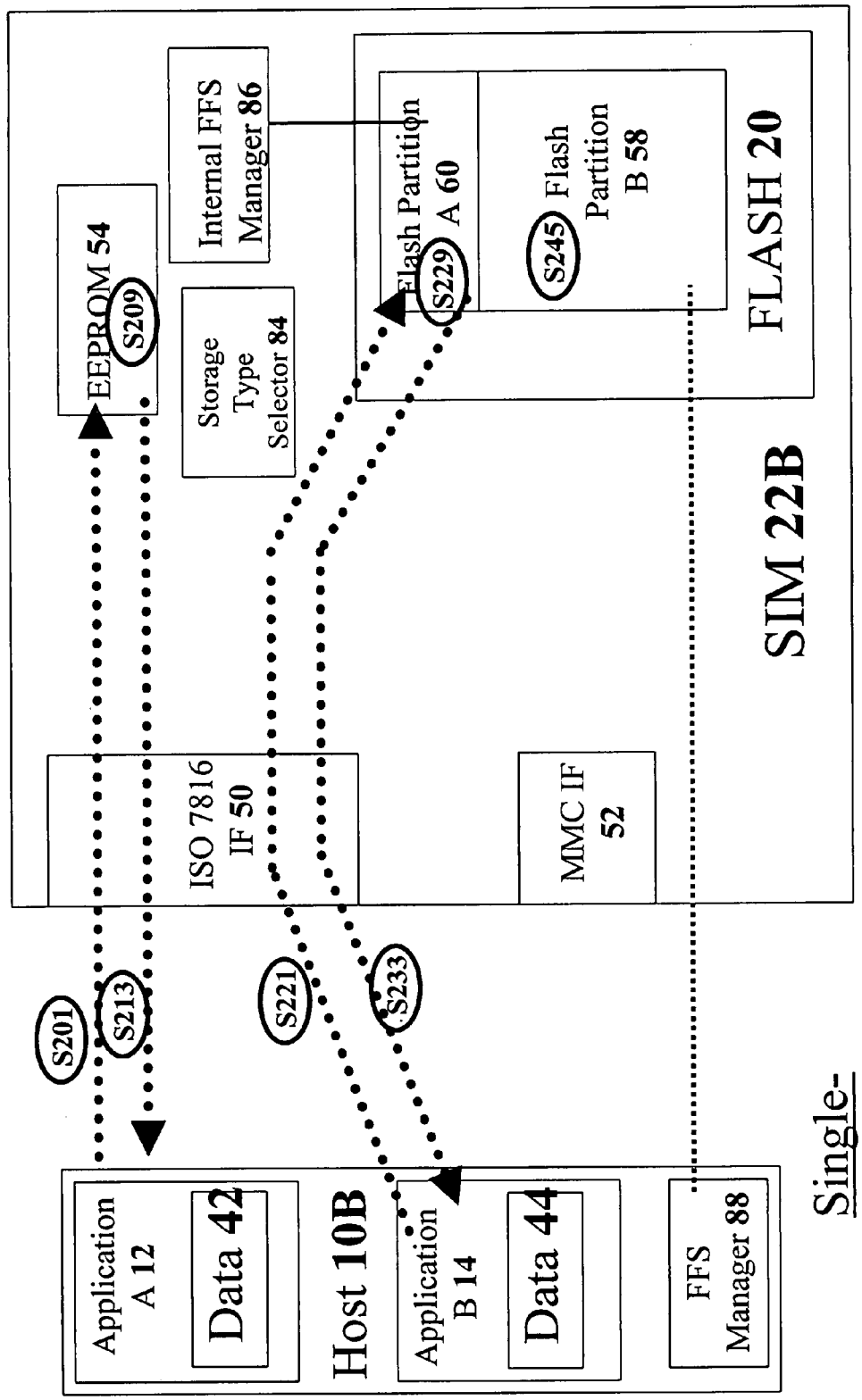
Figure 2C:
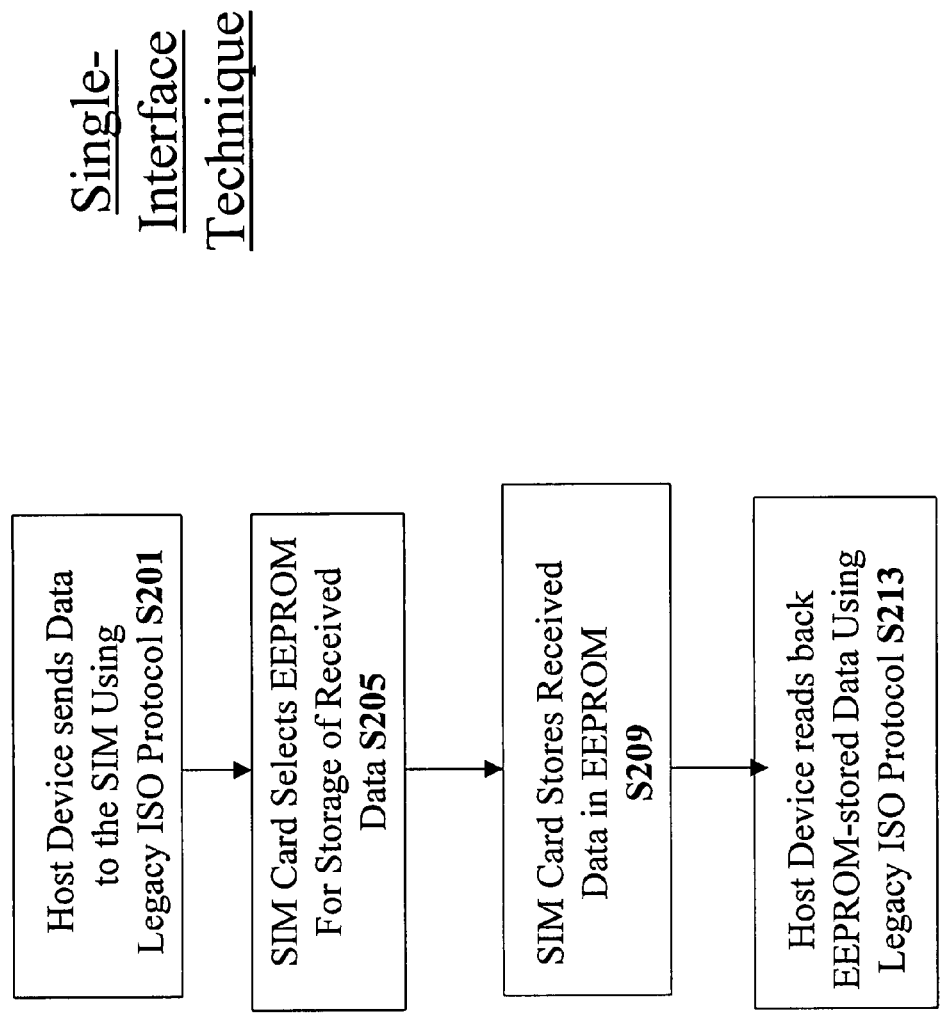
Figure 2D:
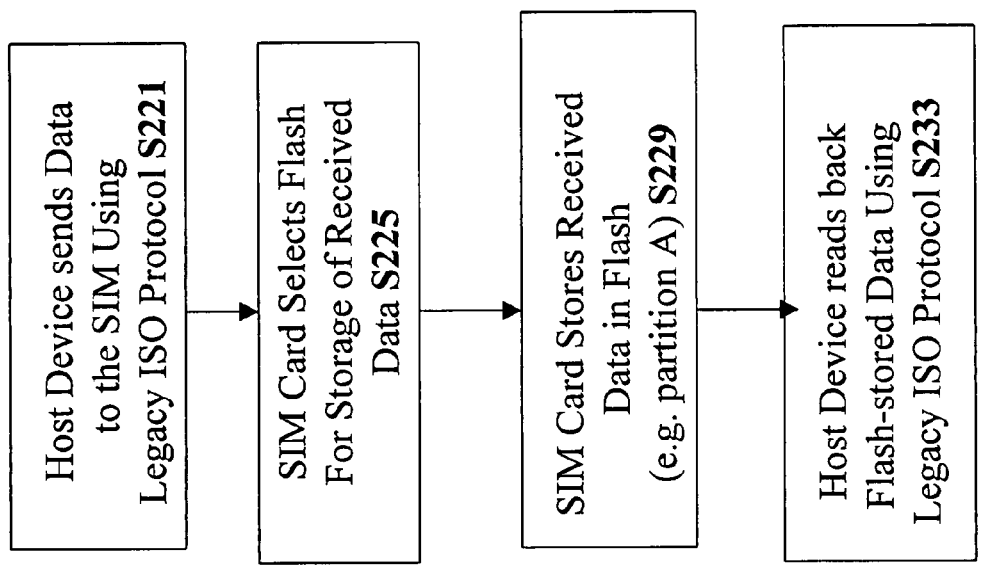

Certain 'single-interface' techniques, for example, certain techniques described in FIGS. 2B-2D, may be useful for extending the SIM EEPROM storage by keeping a portion of the files in the flash instead of the EEPROM. This may increase the amount of data storage available for data received via the legacy ISO interface.

In the example of FIG. 2A, application A 12 is a legacy SIM application that handles secured data. The data 42 used by this application 12 is transferred as a file via the ISO interface 50 and stored S209 on a file system located on the SIM EEPROM 54. Application B 14 handles less secured data. This data 44 is stored in a file located on the SIM Flash storage 20, which is considered less secure than the EEPROM 54.

The capacity of the flash storage is typically much higher than the EEPROM capacity and its cost is typically lower than the cost of the EEPROM. In this example, a SIM internal application (not shown) divides the Flash storage 20 into two partitions: partition A 60 and partition B 58. The general storage area 58 is used as a storage partition and, in the illustrated example, its file system is managed by the host (for example, a flash file system manager 88 residing on the host). The secondary partition 60 is used as an extension of the EEPROM file system, and, in the illustrated example, is managed internally by an internal flash file system (FFS) manager 86—for example, computer code executed by a microprocessor (not shown) of the SIM card. As with any element in any figure, internal flash file system manager 86 may be implemented using any combination of software, hardware and firmware.

As with the SIM card of FIG. 2A, the SIM card of FIG. 2B includes both EEPROM 54 and flash 20 memory. Unlike the SIM card of FIG. 1A, the SIM card of FIG. 2A provides a mechanism whereby data received via the legacy ISO interface 50 may stored in flash memory (i.e. flash partition A 60 for the specific example of FIG. 2A). Thus, in some embodiments, after receiving data via the legacy 50 interface, a determination is made as to whether to store the received data in EEPROM 54, flash 20 or both. As illustrated in FIG. 2A, the SIM card 22A includes a storage type selector 84 for selecting the storage type. Any combination of various criteria may be used when determining the type of data storage. In one example, different file attributes, for example, the file name and/or the file size may be used for determining the storage type.

FIGS. 2B-2F illustrate various 'single interface' data handling techniques where data is written to a given interface and read back via the same interface. It is noted that the techniques described in FIGS. 2C-2D may be useful for extending the SIM EEPROM storage by keeping a portion of the files in the flash instead of the EEPROM. In particular, according to the techniques of FIG. 2C-2D, data received via the legacy interface is written either in EEPROM 54 (i.e. as described in FIG. 2C) or in the flash 20 (i.e. as described in FIG. 2D).

Referring to FIGS. 2B and 2C, it is noted that in step S201 the host device sends data (for example, a data object of type "A") to the SIM over the legacy ISO protocol communications link 70 via the legacy interface, and this data is received by SIM 22B. In step S205 it is determined by the SIM (for example, by storage type selector 84) to store the received data in EEPROM 54 (for example, in accordance with file attribute criteria), and in step S209 the data is stored in EEPROM 54. In step S213 the EEPROM-stored data is read back S213 by host 10B (and send by SIM 22B) using the legacy ISO interface 50 (i.e. the same interface through which the data was sent to the SIM in set S201) over the legacy ISO protocol communications link 70.

Referring to FIGS. 2B and 2D, it is noted that in step S221 the host device sends data (for example, a data object of type "A") to the SIM over the legacy ISO protocol communications link 70 via the legacy interface, and this data is received by SIM 22B. In step S225 it is determined by the SIM (for example, by storage type selector 84) to store the received data in flash 20 (for example, in accordance with file attribute criteria), and in step S229 the data is stored in flash 20. In step S233 the flash-stored data is read back S233 by host 10B (and send by SIM 22B) using the legacy ISO interface 50 (i.e. the same interface through which the data was sent to the SIM in set S221) over the legacy ISO protocol communications link 70.

Figure 2E:
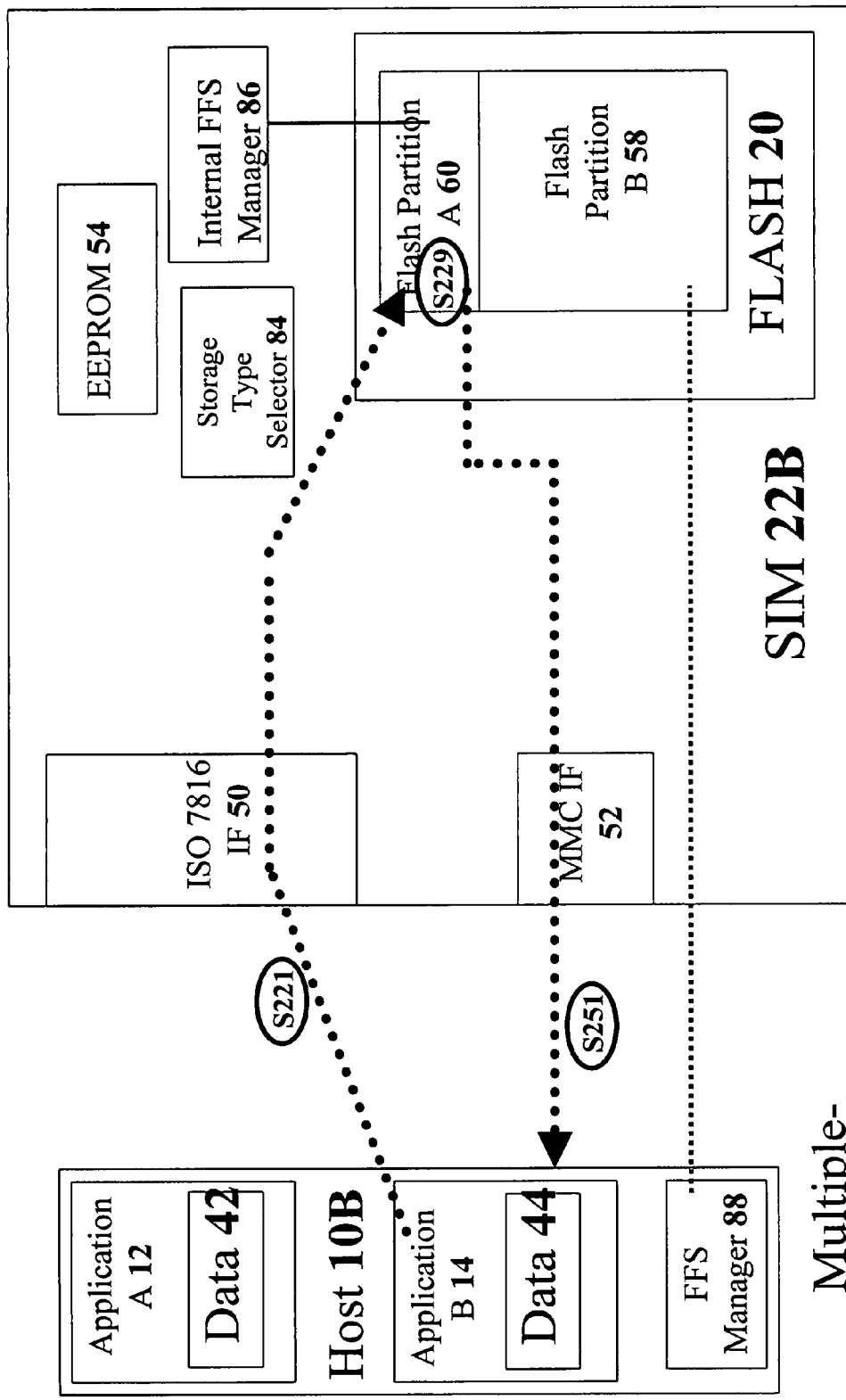
Figure 2F:
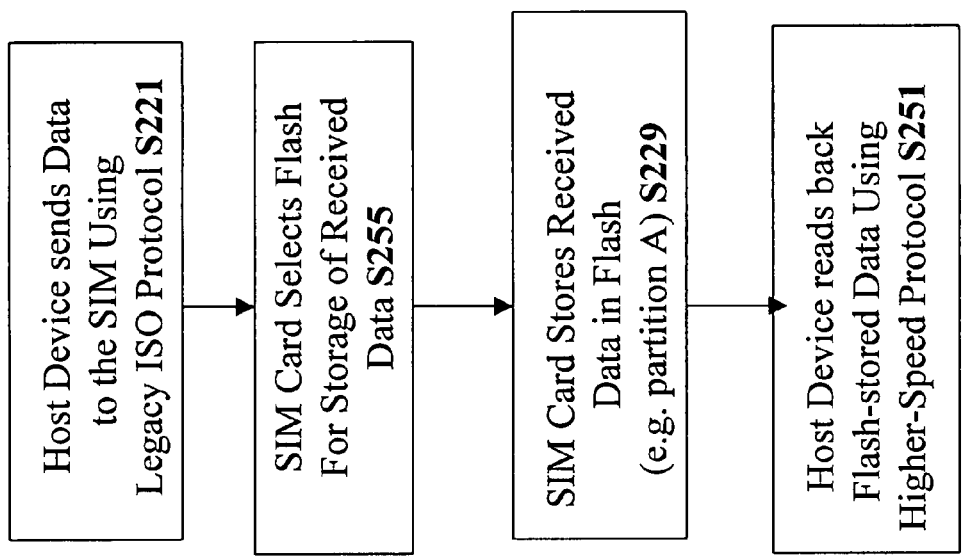

Alternatively or additionally, the flash-stored data may be read via high speed interface 52—this scenario is described in FIGS. 2E-2F.

Thus, referring to FIGS. 2E and 2F, it is noted that in step 251 the flash-stored data is read back by host 10B (and send by SIM 22B) using the high speed interface 52. In FIGS. 2E-2F, data is written to the SIM using a first interface and read back using a second interface different from the first interface. As such, the techniques described in FIGS. 2E-2F are referred to as multiple-interface techniques.

FIGS. 3A-3D describe additional multiple interface techniques provided by exemplary embodiments of the present invention. It is noted that SIM card device 22C of FIG. 3C includes an object translator 92 that is operative to convert objects of first type (i.e. object type A 6) to objects of another type. Object translator 92 may be implemented using any combination of hardware and computer code.

Figure 3A:
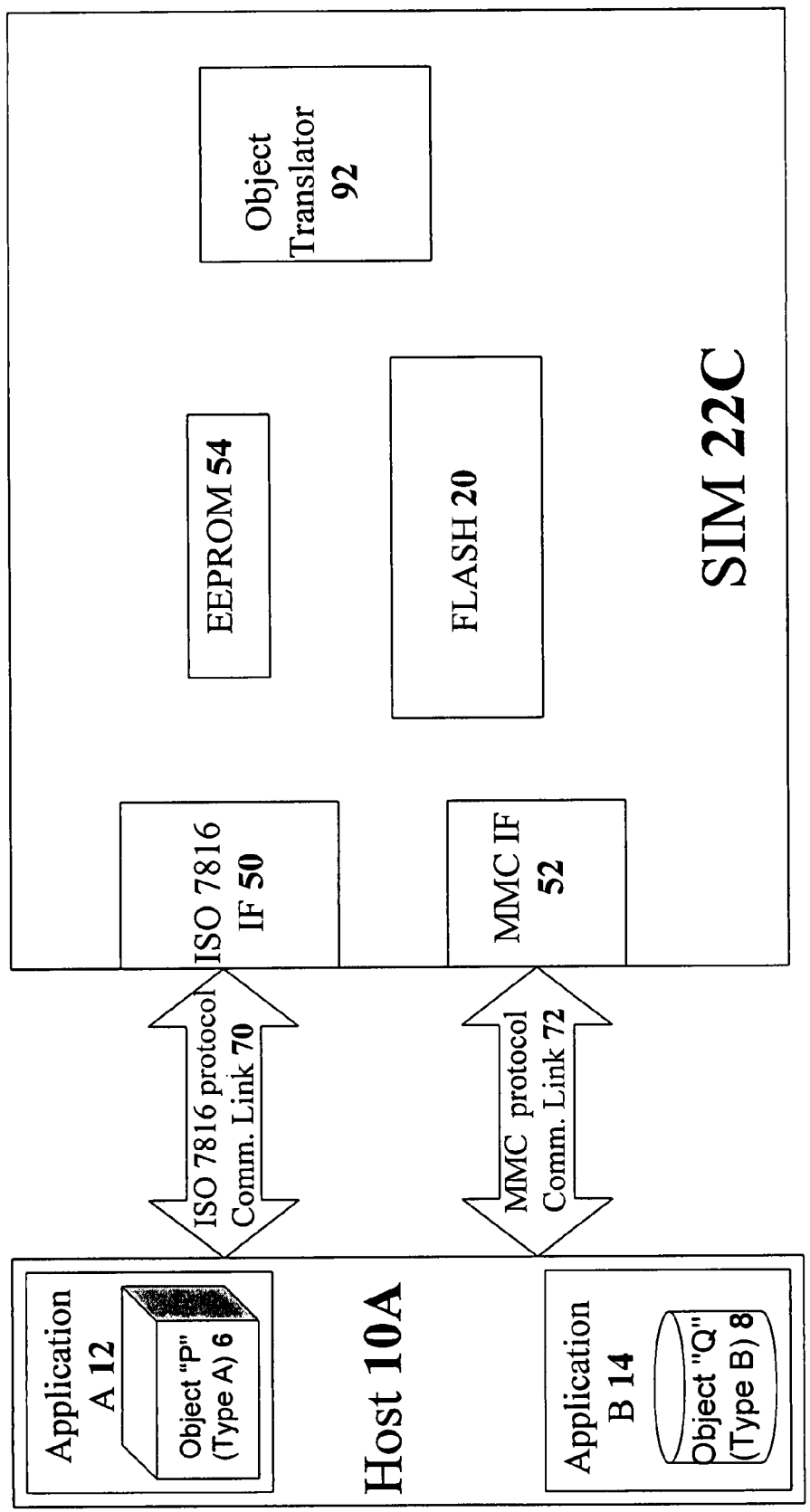
Figure 3B:
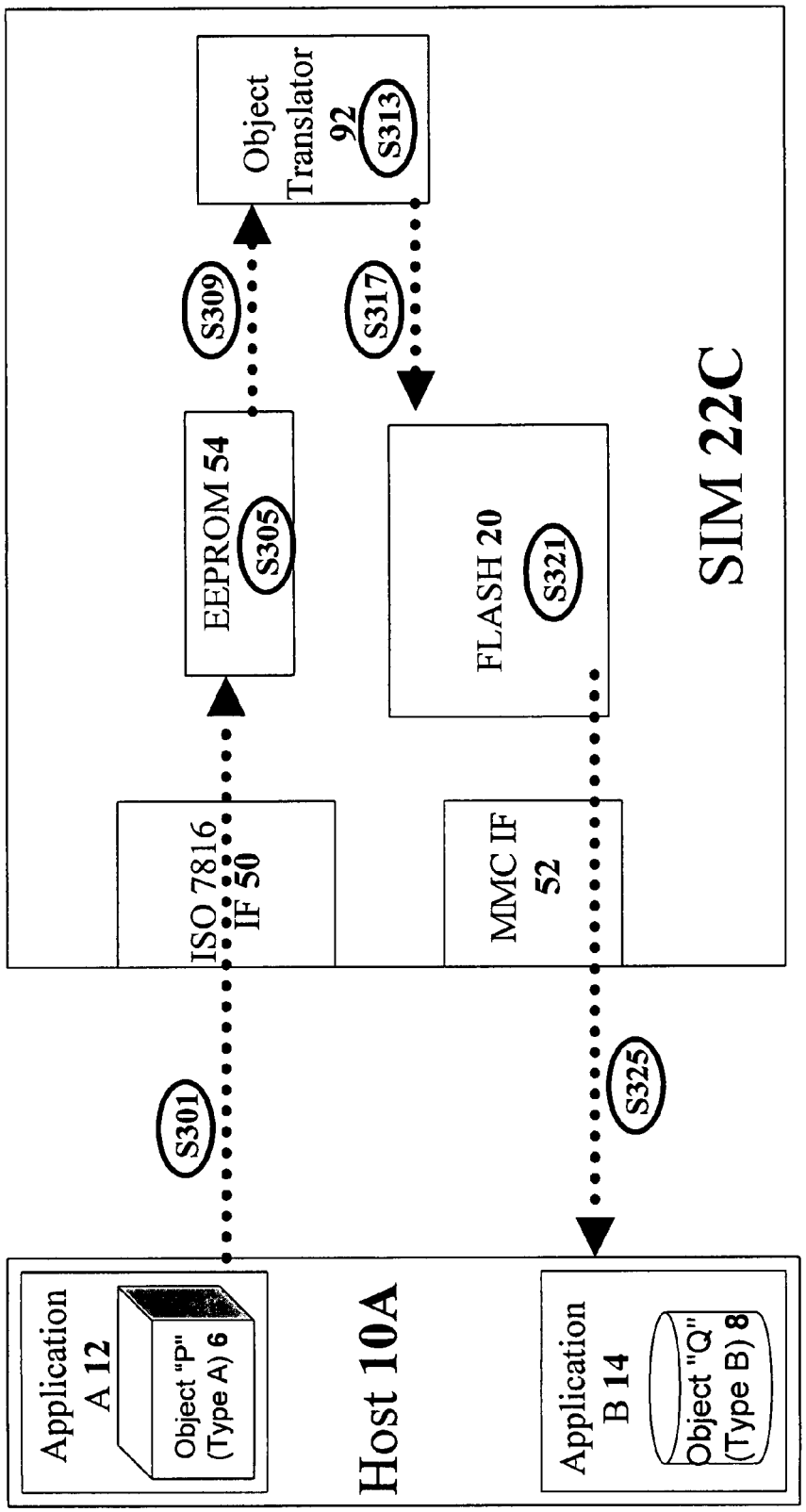
Figure 3D:
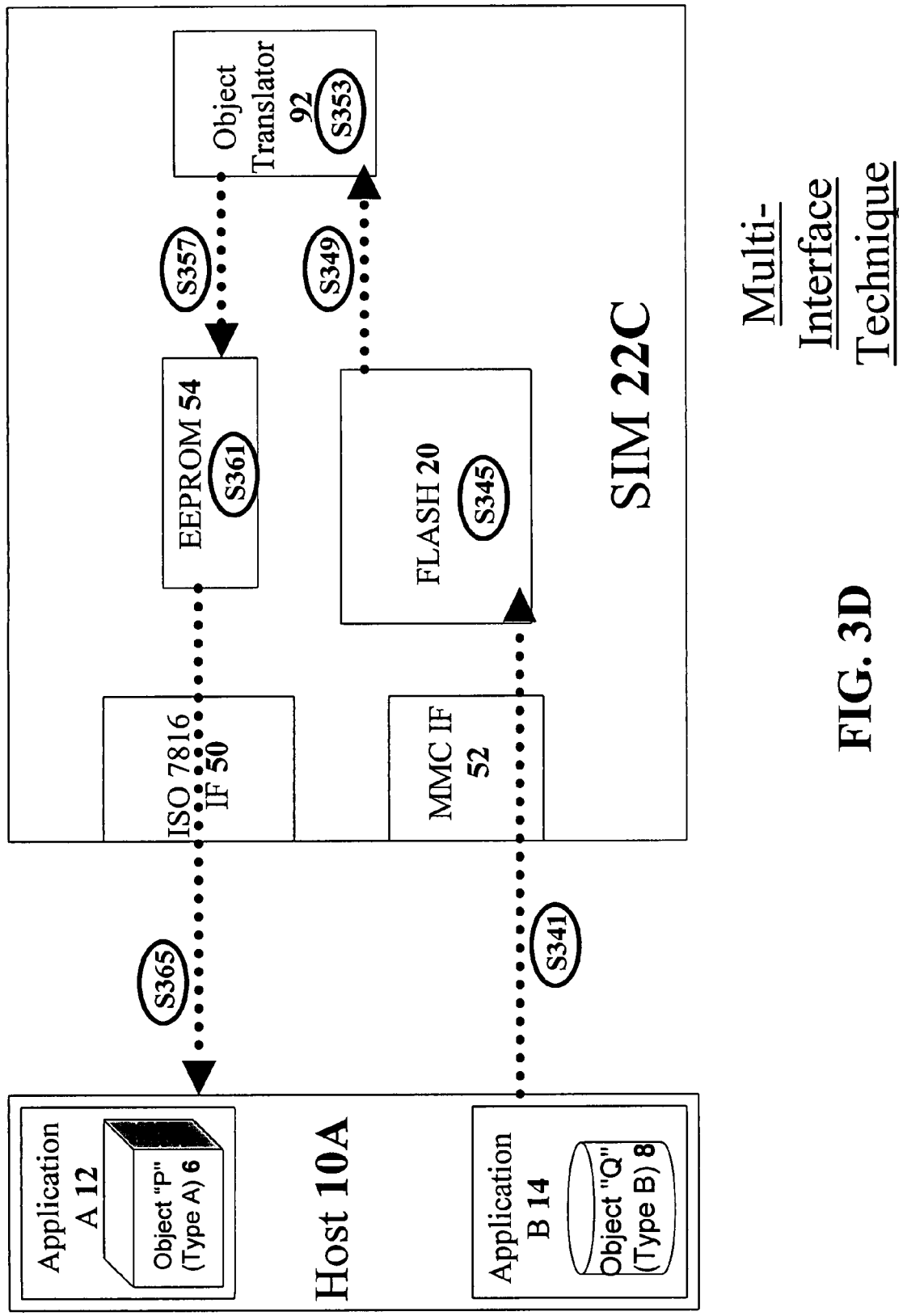

Referring to FIGS. 3B and 3C, it is noted that in step S301 the host device sends data (for example, a data object of type "A") to the SIM over the legacy ISO protocol communications link 70 via the legacy interface, and this data is received by SIM 22B. In step S305, the received data object of type "A" is stored in EEPROM 54. Subsequently, the EEPROM-stored object is retrieved S309, and converted into an object of type "B" S313 by the onboard object translator 92. This object of type "B" is sent S317 to flash 20 and stored S321 in flash 20. The flash-stored object may be retrieved from flash 20, and send S325 back to the host 10A via the high speed interface, allowing the host device to read back the data.

In one example, application A 12 is a legacy SIM phone book application, and application B 14 is Microsoft Outlook. Thus, according to this particular example, the technique described in FIGS. 3B-3C is useful for enabling a user to vie phone numbers saved to the SIM phone book in an Outlook Contacts folder.

It is noted that according to FIGS. 3B-3C, data written to the SIM via the legacy interface may be read back via the high speed interface. It is appreciated that this may work in the 'other direction' as described in FIGS. 3D-3E, where data written via the high speed interface may be read back via the legacy interface after conversion of object type, as described in steps S341, S345, S349, S253, S357, S361 and S365.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise. The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method comprising:
   at a subscriber identity module (SIM) card operatively coupleable to a mobile phone, the SIM card having a first card interface, a second card interface different from the first card interface, a memory, and a controller, the controller performing:
      receiving a data read request from the mobile phone for data stored in the memory of the SIM card;
      retrieving the data from the memory of the SIM card in response to receiving the data read request from the mobile phone, wherein the retrieved data was previously received by the SIM card from the mobile phone via the first card interface; and
      sending the retrieved data to the mobile phone via the second card interface.

2. The method of claim 1, wherein the data read request is received via the second card interface.

3. The method of claim 1, wherein the data is received using a file-type protocol and the data is sent to the mobile phone from the SIM card using a block-type protocol.

4. The method of claim 1, wherein the data is received using a block-type protocol and the data is sent to the mobile phone from the SIM card using a file-type protocol.

5. The method of claim 1, wherein the first card interface is an ISO 7816 interface and the second card interface is a high-speed interface.

6. The method of claim 5, wherein the second card interface is a multimedia card (MMC) interface.

7. The method of claim 1, wherein the memory includes a flash memory and an electrically erasable programmable read only memory (EEPROM).

8. The method of claim 7, wherein the flash memory is partitioned into a primary partition and a secondary partition, and wherein the secondary partition is used as an extension of the EEPROM.

9. The method of claim 8, wherein the secondary partition is managed by an internal flash file system manager that is executed by the controller and wherein the primary partition is managed by an external flash file system residing on the mobile phone.

10. The method of claim 1, wherein the memory includes flash memory and EEPROM memory, wherein the controller has previously
   determined, in accordance with at least one attribute of the data, a storage location for the data selected from the group consisting of the EEPROM memory and the flash memory and has stored the data in the determined storage location.

11. The method of claim 1, wherein at least one of the first card interface and the second card interface is a contactless interface.

12. The method of claim 10, wherein the at least one attribute of the received data is a file size associated with the data.

13. The method of claim 10, wherein the at least one attribute of the received data is a file name associated with the data.

14. The method of claim 1, further comprising the controller performing:
   prior to retrieving the data, receiving the data in the SIM card from the mobile phone via the first interface storing the data in the memory of the SIM card.

15. The method of claim 14, further comprising the controller performing receiving from the mobile phone the data read request for the stored data.

16. The method of claim 5, wherein the second card interface is a secure digital (SD) interface.

17. The method of claim 5, wherein the second card interface is a universal serial bus (USB) interface.

18. A method comprising:
   in a subscriber identity module (SIM) card that is operatively coupleable to a mobile
   phone, the SIM card including a controller, a flash memory, and an electrically erasable programmable read only memory (EEPROM), the controller performing: selecting a storage location for a received data file, wherein the storage location
   selected is one of the EEPROM and the flash memory—the storage location selected in accordance with a first file attribute of the received data file;
   partitioning the flash memory into a first partition and a second partition, wherein
   the second partition is used as an extension of the EEPROM; and when the storage location of the received data file is selected to be the EEPROM, storing the data file in the second partition instead of in the EEPROM in response to satisfaction of a predetermined criterion by the received data file, wherein the predetermined criterion includes a size of the received data file being at least as large as a threshold size.

19. The method of claim 18, wherein the predetermined criterion specifies that a file name associated with the received file matches one of one or more predetermined file names.

20. The method of claim 18, wherein the predetermined criterion is satisfied when the size of the received data file exceeds the threshold size.

21. A subscriber identity module (SIM) card device comprising: a flash memory; an electrically erasable programmable read only memory (EEPROM); and a controller operative to:
partition the flash memory into a primary partition and a secondary partition, wherein the secondary partition is used as an extension of the EEPROM;
upon receiving a data file via a data interface of the SIM card device, determine whether the data file is to be stored at the EEPROM by evaluating a first file attribute of the data file; and
when the evaluation of the first file attribute of the data file indicates that the data file is to be stored at the EEPROM, store the data file in the second partition instead of in the EEPROM in response to satisfaction of a predetermined criterion by the data file, wherein the predetermined criterion includes a size of the received data file being at least as large as a threshold size.

22. The SIM card device of claim 21, wherein the predetermined criterion specifies that a file name associated with the received file matches one of one or more predetermined file names.

23. The subscriber identity module card device of claim 21, wherein the predetermined criterion further includes the size of the received data exceeding the threshold size.

24. A non-transitory computer readable storage medium having computer readable code embodied in the non-transitory computer readable storage medium, wherein the computer readable code, when executed by a processor of a subscriber identity module (SIM) card, causes the processor to:
partition a flash memory of the SIM card into a primary partition and a secondary partition, wherein the secondary partition is used as an extension of the EEPROM;
determine that a data file received at the SIM card is to be stored at an electrically erasable programmable read only memory (EEPROM) within the SIM card in accordance with an attribute of the data;
and
store the data file in the second partition instead of in the EEPROM in response to
satisfaction of a predetermined criterion by the data file, wherein the predetermined criterion includes a size of the received data file being at least as large as a threshold size.

25. The non-transitory computer readable storage medium of claim 24, wherein the predetermined criterion specifies that a file name associated with the received file matches one of one or more predetermined file names.

26. The non-transitory computer readable storage medium of claim 24, wherein the predetermined criterion further includes the size of the received data exceeding the threshold size.

* * * * *

UNITED STATES PATENT AND TRADEMARK OFFICE
CERTIFICATE OF CORRECTION

PATENT NO. : 8,190,206 B2
APPLICATION NO. : 11/710989
DATED : May 29, 2012
INVENTOR(S) : Menahem Lasser et al.

It is certified that error appears in the above-identified patent and that said Letters Patent is hereby corrected as shown below:

In the Claims

Column 12, Claim 14, Line 44, "card from the mobile phone via the first interface storing" should read --card from the mobile phone via the first interface and storing--.

Column 12, Claim 18, Line 61, "selected is one of the EEPROM and the flash memory—the storage" should read --selected is one of the EEPROM and the flash memory, the storage--.

Column 14, Claim 23, Line 7, "of the received data exceeding the threshold size." should read --of the received data file exceeding the threshold size.--.

Column 14, Claim 26, Line 31, "includes the size of the received data exceeding the threshold size." should read --includes the size of the received data file exceeding the threshold size.--.

Signed and Sealed this
Twenty-sixth Day of August, 2014

Michelle K. Lee
*Deputy Director of the United States Patent and Trademark Office*